United States Patent
Speldrich et al.

(10) Patent No.: US 8,418,549 B2
(45) Date of Patent: Apr. 16, 2013

(54) FLOW SENSOR ASSEMBLY WITH INTEGRAL BYPASS CHANNEL

(75) Inventors: Jamie Speldrich, Freeport, IL (US); Lamar Floyd Ricks, Lewis Center, OH (US); Craig Scott Becke, South Vienna, OH (US); Feng Weichao, Nanjing (CN)

(73) Assignee: Honeywell International Inc., Morristown, NJ (US)

( * ) Notice: Subject to any disclaimer, the term of this patent is extended or adjusted under 35 U.S.C. 154(b) by 67 days.

(21) Appl. No.: 13/018,037

(22) Filed: Jan. 31, 2011

(65) Prior Publication Data

US 2012/0192642 A1 Aug. 2, 2012

(51) Int. Cl.
*G01F 1/68* (2006.01)

(52) U.S. Cl.
USPC .................................. 73/202.5; 73/204.22

(58) Field of Classification Search .................. None
See application file for complete search history.

(56) References Cited

U.S. PATENT DOCUMENTS

| | | | |
|---|---|---|---|
| 3,559,482 A | 2/1971 | Baker et al. | |
| 3,838,598 A | 10/1974 | Tompkins | |
| 3,981,074 A | 9/1976 | Yamamoto et al. | |
| 4,100,801 A | 7/1978 | LeMay | |
| 4,326,214 A | 4/1982 | Trueblood | |
| 4,411,292 A | 10/1983 | Schiller | |
| 4,418,723 A | 12/1983 | Koni et al. | |
| RE31,570 E | 5/1984 | Drexel | |
| 4,648,270 A * | 3/1987 | Johnson et al. | 73/202.5 |
| 4,653,321 A | 3/1987 | Cunningham et al. | |
| 4,655,088 A | 4/1987 | Adams | |
| 4,672,997 A | 6/1987 | Landis et al. | |
| 4,691,566 A * | 9/1987 | Aine | 73/204.26 |
| 4,790,181 A | 12/1988 | Aine | |
| 4,800,754 A | 1/1989 | Korpi | |
| 4,829,818 A | 5/1989 | Bohrer | |

(Continued)

FOREIGN PATENT DOCUMENTS

DE 102004019521 11/2005
EP 2068129 10/2009

(Continued)

OTHER PUBLICATIONS

Bodycote, "Competitive Teardown Analysis of Sensirion EMI," Bodycote Testing Group, 24 pages, Oct. 15, 2007.

(Continued)

*Primary Examiner* — Harshad R Patel
(74) *Attorney, Agent, or Firm* — Seager Tufte & Wickhem LLC

(57) ABSTRACT

Flow sensor assemblies having increased flow range capabilities are disclosed. In one illustrative embodiment, a flow sensor assembly includes a housing with an inlet flow port, an outlet flow port, a fluid channel extending between the inlet flow port and the outlet flow port, and a bypass channel having a pair of taps fluidly connected to the fluid channel at separate locations. A flow sensor for sensing a measure related to a flow rate of a fluid flowing through the fluid channel can positioned in the bypass channel. A pressure differential between the two taps of the bypass channel can drive a fraction of a fluid flowing through the fluid channel through the bypass channel. The flow sensor assembly may be configured to achieve, control, and/or balance a desired fraction of fluid flow through the bypass channel and past the flow sensor.

4 Claims, 11 Drawing Sheets

U.S. PATENT DOCUMENTS

| | | | |
|---|---|---|---|
| 4,856,328 A | 8/1989 | Johnson | |
| 4,961,344 A | 10/1990 | Rodder | |
| 4,976,283 A | 12/1990 | Wildfang et al. | |
| 5,063,787 A | 11/1991 | Khuzai et al. | |
| 5,107,441 A | 4/1992 | Decker | |
| 5,231,877 A | 8/1993 | Henderson | |
| 5,295,394 A * | 3/1994 | Suzuki | 73/202 |
| 5,319,973 A | 6/1994 | Crayton et al. | |
| 5,332,005 A | 7/1994 | Baan | |
| 5,341,848 A | 8/1994 | Laws | |
| 5,357,793 A | 10/1994 | Jouwsma | |
| 5,379,650 A * | 1/1995 | Kofoed et al. | 73/861.52 |
| 5,385,046 A | 1/1995 | Yamakawa et al. | |
| 5,400,973 A | 3/1995 | Cohen | |
| 5,404,753 A | 4/1995 | Hecht et al. | |
| 5,535,633 A * | 7/1996 | Kofoed et al. | 73/861.52 |
| 5,609,303 A | 3/1997 | Cohen | |
| 5,634,592 A | 6/1997 | Campau | |
| 5,717,145 A | 2/1998 | Yasuhara et al. | |
| 5,741,968 A | 4/1998 | Arai | |
| 5,750,892 A | 5/1998 | Huang et al. | |
| 5,763,787 A | 6/1998 | Gravel et al. | |
| 5,829,685 A | 11/1998 | Cohen | |
| 5,844,135 A | 12/1998 | Brammer et al. | |
| 5,942,694 A | 8/1999 | Robins et al. | |
| 6,119,730 A | 9/2000 | McMillan | |
| 6,128,963 A | 10/2000 | Bromster | |
| 6,247,495 B1 | 6/2001 | Yamamoto et al. | |
| 6,322,247 B1 * | 11/2001 | Bonne et al. | 374/138 |
| 6,655,207 B1 | 12/2003 | Speldrich et al. | |
| 6,779,395 B2 | 8/2004 | Hornung et al. | |
| 6,826,966 B1 | 12/2004 | Karbassi et al. | |
| 7,107,834 B2 | 9/2006 | Meneghini et al. | |
| 7,121,139 B2 | 10/2006 | Shajii et al. | |
| 7,454,984 B1 | 11/2008 | Ross et al. | |
| 7,464,611 B2 | 12/2008 | Matter et al. | |
| 7,479,255 B2 | 1/2009 | Otani et al. | |
| 7,516,761 B2 | 4/2009 | Setescak | |
| 7,549,332 B2 | 6/2009 | Yamashita et al. | |
| 7,568,383 B2 | 8/2009 | Colvin et al. | |
| 7,698,958 B2 | 4/2010 | Matter et al. | |
| 7,757,553 B2 | 7/2010 | Meier et al. | |
| 7,805,986 B2 | 10/2010 | Colvin et al. | |
| 7,878,980 B2 | 2/2011 | Ricciardelli | |
| 2006/0101907 A1 * | 5/2006 | Shajii et al. | 73/202.5 |
| 2006/0101908 A1 | 5/2006 | Meneghini et al. | |
| 2007/0062275 A1 * | 3/2007 | Beyrich et al. | 73/204.21 |
| 2012/0186336 A1 | 7/2012 | Speldrich et al. | |

FOREIGN PATENT DOCUMENTS

| | | |
|---|---|---|
| GB | 2123564 | 2/1984 |
| JP | 49120131 | 11/1974 |
| JP | 3099230 | 4/1991 |
| JP | 7083713 | 3/1995 |
| JP | 10307047 | 11/1998 |
| WO | 0111322 | 2/2001 |
| WO | 0161282 | 8/2001 |
| WO | 0198736 | 12/2001 |
| WO | 2006131531 | 12/2006 |
| WO | 2007137978 | 12/2007 |

OTHER PUBLICATIONS

U.S. Appl. No. 13/018,017, filed Jan. 31, 2011.
Honeywell, "Airflow, Force and Pressure Sensors," Product Range Guide, 20 pages, Mar. 2011.
Honeywell, "Airflow Sensors Line Guide," 6 pages, Nov. 2010.
Honeywell, "AWM43600V, Issue No. 4," 1 page, Jul. 29, 1996.
Honeywell, "AWM43600V, Part No. SS12177," 1 page, Jul. 10, 1998.
"Schematic Cross-Section for AWM43600," 1 page, prior to Jan. 31, 2011.

* cited by examiner

US 8,418,549 B2

FLOW SENSOR ASSEMBLY WITH INTEGRAL BYPASS CHANNEL

RELATED APPLICATION

This application is related to U.S. application Ser. No. 13/018,017, entitled "FLOW SENSOR WITH ENHANCED FLOW RANGE CAPABILITY", filed on the even date herewith, which is hereby incorporated by reference.

FIELD

The present disclosure relates generally to flow sensors, and more particularly, to flow sensor that are configured to sense a fluid flow passing through a flow channel.

BACKGROUND

Flow sensors are often used to sense the flow rate of a fluid (e.g. gas or liquid) traveling through a fluid channel. Such flow sensors are commonly used in a wide variety of applications including, for example, medical applications, flight control applications, industrial process applications, combustion control applications, weather monitoring applications, as well as many others. In some instances, the mass volumetric flow rate of the flow sensor may be limited because the flow sensor may become saturated when exposed to higher mass volumetric flow rates. This can be undesirable in some applications.

SUMMARY

The present disclosure relates generally to flow sensors, and more particularly, to methods and devices for increasing the flow rate range that can be sensed. In one illustrative embodiment, a flow sensor assembly includes a housing with an inlet flow port and an outlet flow port, a fluid channel extending between the inlet flow port and the outlet flow port, and a bypass channel. In some instances, the housing may also include one or more partitions positioned in the fluid channel to help promote laminar flow in the fluid channel. The bypass channel may include two taps in fluid communication with the fluid channel. An upstream tap may be connected to the fluid channel at a first upstream location, such as upstream of the one or more partitions (when provided) and downstream of the inlet flow port of the fluid channel. A downstream tap may be connected to the fluid channel at a second downstream location, such as downstream of the one or more partitions (when provided) and upstream of the outlet flow port of the fluid channel. A flow sensor may be in fluid communication with the bypass channel, and may sense a measure related to a flow rate of a fluid flowing through the bypass channel and, hence, the fluid channel. In some cases, one or more features may be provided in the upstream tap, the downstream tap and/or the bypass channel to restrict the fluid flow rate through the bypass channel, thereby extending the effective flow rate range of the flow sensor assembly.

In some cases, the housing can be a single piece molded part, and may define at least part of the inlet and outlet flow ports, the fluid channel, and the bypass channel. In some cases, a cover may be mounted to the housing to define, for example, the remaining portion of the fluid channel and bypass channel, as desired. In some cases, the single piece molded part may also define the one or more partitions, when provided.

The preceding summary is provided to facilitate an understanding of some of the features of the present disclosure, and is not intended to be a full description. A full appreciation of the disclosure can be gained by taking the entire specification, claims, drawings, and abstract as a whole.

BRIEF DESCRIPTION

The disclosure may be more completely understood in consideration of the following detailed description of various illustrative embodiments of the disclosure in connection with the accompanying drawings, in which.

DESCRIPTION

Figure 1:
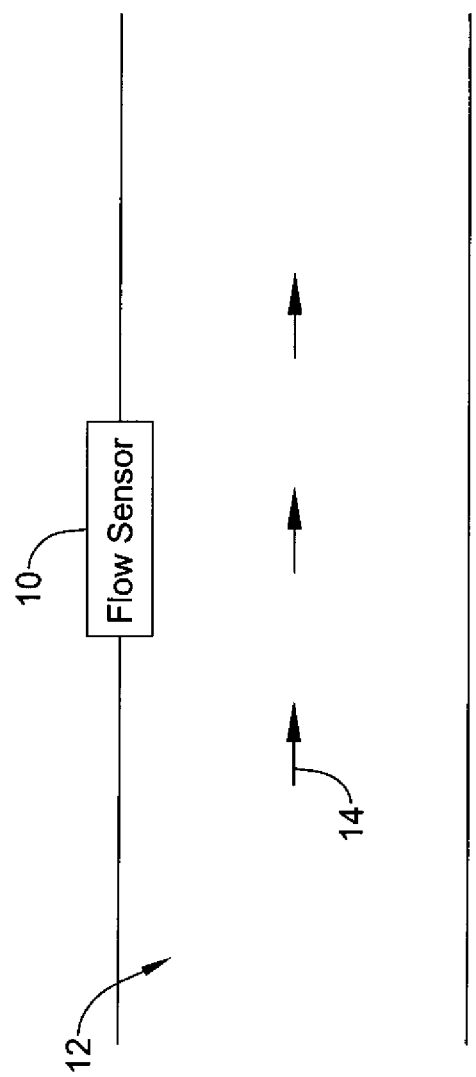
FIG. 1 is a schematic diagram of an illustrative flow sensor for measuring a fluid flow rate of a fluid passing through a fluid channel.

The following description should be read with reference to the drawings wherein like reference numerals indicate like elements throughout the several views. The description and drawings show several embodiments which are meant to be illustrative and not limiting.

FIG. 1 is a schematic diagram of an illustrative flow sensor 10 for measuring a fluid flow rate of a fluid flow 14 passing through a fluid channel 12. The term "fluid" as used herein can refer to a gas flow or a liquid flow, depending on the application. In the illustrative embodiment, the flow sensor 10 may be exposed to and/or disposed in fluid communication with the fluid channel 12 to measure one or more properties of the fluid flow 14. For example, the flow sensor 10 may measure the mass flow and/or velocity of the fluid flow 14 using one or more thermal sensors (e.g. see FIG. 2), pressure sensors, acoustical sensors, optical sensors, pitot tubes, and/or any other suitable sensor or sensor combination, as desired. In some cases, the flow sensor 10 may be a microbridge or a Microbrick™ sensor assembly (e.g. see FIG. 3) available from the assignee of the present application, but this is not required. Some illustrative methods and sensor configurations that are considered suitable for measuring the mass flow and/or velocity of the fluid flow 14 are disclosed in, for example, U.S. Pat. Nos. 4,478,076; 4,478,077; 4,501,144; 4,581,928; 4,651,564; 4,683,159; 5,050,429; 6,169,965; 6,223,593; 6,234,016; 6,502,459; 7,278,309; 7,513,149; and 7,647,842. It is contemplated that flow sensor 10 may include any of these flow sensor configurations and methods, as desired. It must be recognized, however, that flow sensor 10 may be any suitable flow sensor, as desired.

In the illustrative example, the fluid channel 12 may experience a range of flow rates of fluid flow 14. For example, the fluid channel 12 may include a high-volume fluid flow, a mid-volume fluid flow, or a low-volume fluid flow. Example fluid flow applications can include, but are not limited to, medical applications (e.g. respirometers, ventilators, spirometers, oxygen concentrators, spectrometry applications, gas chromatography applications, sleep apnea machines, nebulizers, anesthesia delivery machines, etc.), flight control applications, industrial applications (e.g. air-to-fuel ratio, spectrometry, fuel cells, gas leak detection, gas meters, HVAC applications), combustion control applications, weather monitoring applications, as well as any other suitable fluid flow applications, as desired.

Figure 2:
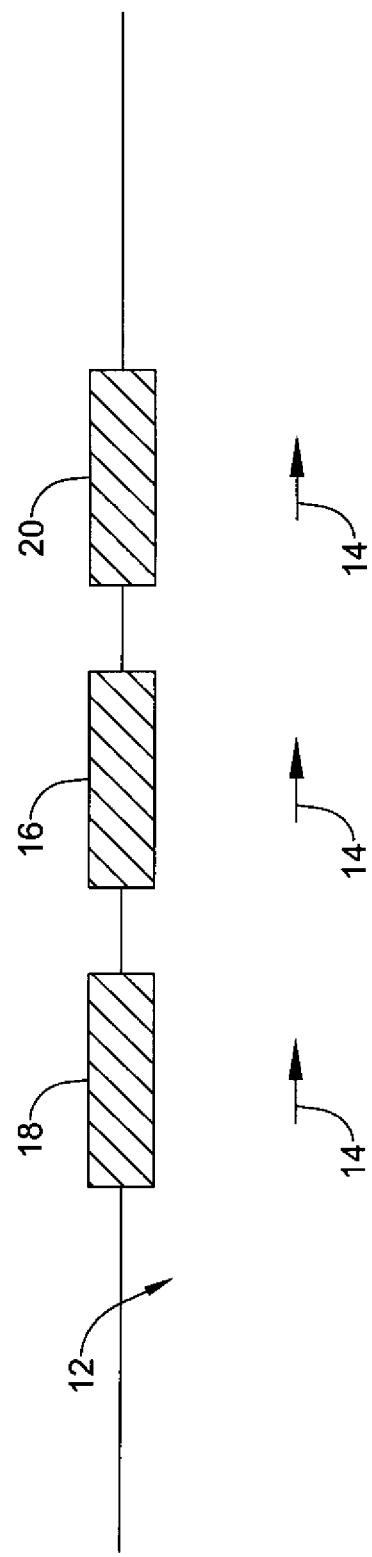
FIG. 2 is a schematic diagram of an illustrative thermal flow sensor assembly for measuring the flow rate of a fluid passing through a fluid channel.

Turning to FIG. 2, which is a schematic diagram of an illustrative thermal flow sensor assembly for measuring the flow rate of a fluid flow 14 passing through a fluid channel 12. In the illustrative embodiment of FIG. 2, the flow sensor assembly includes one or more heater elements, such as heater element 16, and one or more sensor elements 18 and 20, for sensing a flow rate of a fluid flow 14 in the fluid channel 12. As shown in FIG. 2, a first sensor element 18 can be positioned upstream of the heater element 16, and a second sensor element 20 can be positioned downstream of the heater element 16. However, this is not meant to be limiting and it is contemplated that, in some embodiments, the fluid channel 12 may be a bi-directional fluid channel such that, in some cases, the first sensor element 18 is downstream of the heater element 16 and the second sensor element 20 is upstream of the heater element 16. In some instances only one sensor element may be provided, and in other embodiments, three or more sensor elements may be provided. In some instances, both sensor elements 18 and 20 may be positioned upstream (or downstream) of the heater element 16.

In some cases, the first sensor element 18 and the second sensor element 20 may be thermally sensitive resistors that have a relatively large positive or negative temperature coefficient, such that the resistance varies with temperature. In some cases, the first and second sensing elements 18 and 20 may be thermistors. In some instances, the first sensor element 18, the second sensor element 20, and any additional sensor elements may be arranged in a Wheatstone bridge configuration, but this is not required.

In the example shown, when no fluid flow is present in the fluid channel 12 and the heater element 16 is heated to a temperature higher than the ambient temperature of the fluid in the fluid flow 14, a temperature distribution may be created and transmitted in a generally symmetrical distribution about the heater element 16 to upstream sensor element 18 and downstream sensor element 20. In this example, upstream sensor element 18 and downstream sensor element 20 may sense the same or similar temperature (e.g. within 25 percent, 10 percent, 5 percent, 1 percent, 0.001 percent, etc.). In some cases, this may produce the same or similar output voltage in the first sensor element 18 and the second sensor element 20.

When a non-zero fluid flow 14 is present in the fluid channel 12 and the heater element 16 is heated to a temperature higher than the ambient temperature of the fluid in the fluid flow 14, the symmetrical temperature distribution may be disturbed and the amount of disturbance may be related to the flow rate of the fluid flow 14 in the fluid channel 12. The flow rate of the fluid flow 14 may cause the upstream sensor element 18 to sense a relatively cooler temperature than the downstream sensor element 20. In other words, the flow rate of the fluid flow 14 may cause a temperature differential between the upstream sensor element 18 and the downstream sensor element 20 that is related to the flow rate of the fluid flow 14 in the fluid channel 12. The temperature differential between the upstream sensor element 18 and the downstream sensor element 20 may result in an output voltage differential between the upstream sensor element 18 and the downstream sensor element 20.

In another illustrative embodiment, the mass flow and/or velocity of the fluid flow 14 may be determined by providing a transient elevated temperature condition in the heater element 16, which in turn, causes a transient elevated temperature condition (e.g. heat pulse) in the fluid flow 14. When there is a non-zero flow rate in the fluid flow 14, the upstream sensor element 18 may receive a transient response later than the downstream sensor element 20. The flow rate of the fluid flow 14 can then be computed using the time lag between the upstream sensor element 18 and downstream sensor element 20, or between the time the heater is energized and when the corresponding elevated temperature condition (e.g. heat pulse) is sensed by one of the sensors, such as the downstream sensor 20.

Figure 3:
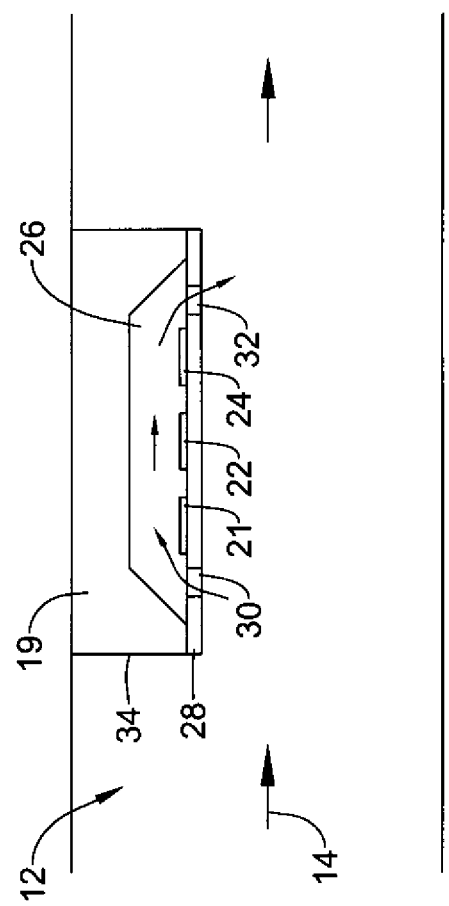
FIG. 3 is a schematic diagram of an illustrative thermal flow sensor assembly for measuring the flow rate of a fluid passing through a fluid channel.
Figure 4:
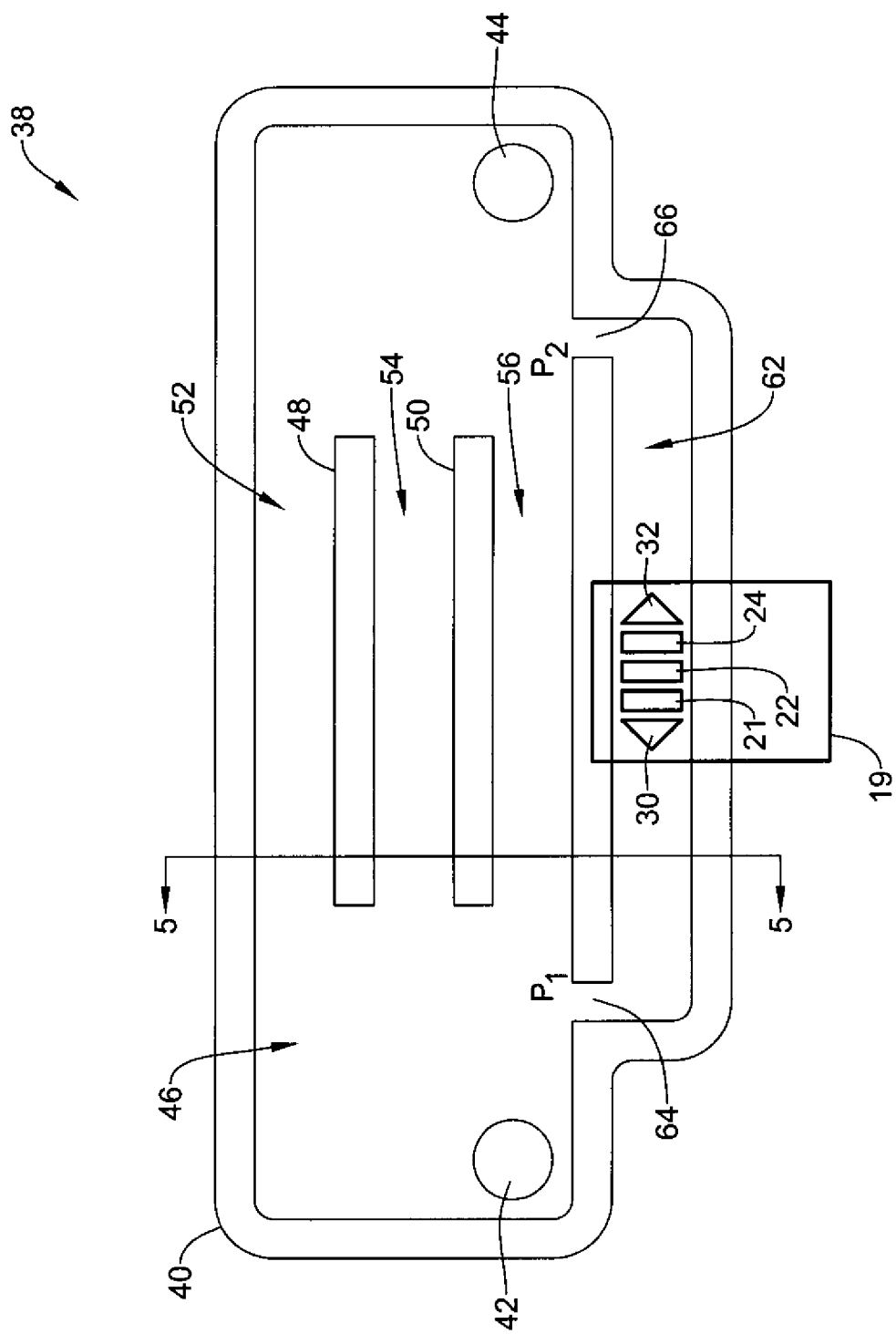
FIG. 4 is a top view of an illustrative packaged thermal flow sensor assembly.

FIG. 3 is a schematic diagram of an illustrative thermal flow sensor assembly for measuring the flow rate of a fluid flow 14 passing through a fluid channel 12. In some cases, thermal flow sensor assembly may be a manifestation of the flow sensor assembly shown in FIG. 3 (or FIG. 2). As shown in FIG. 3, the flow sensor 19 may be a thermal flow sensor (such as, for example, a microbridge flow sensor, a thermal anemometer sensor, a MEMS-based sensor, etc.) for measuring the flow rate of a fluid flow 14 passing through a fluid channel 12. In the illustrative embodiment, the flow sensor 19 includes a substrate 34 defining a sensor channel 26 for receiving at least some of the fluid flowing through fluid channel 12. In some embodiments, the substrate 34 may be a silicon substrate or other substrate, as desired. A layer 28 may be formed on or in the substrate, which may support one or more heater elements, such as heater element 22, and one or more sensor elements, such as sensor elements 21 and 24, for sensing a flow rate of a fluid flow 14 in the channel 26. As illustrated, layer 28 may be fabricated to include openings 30 and 32 for fluidly connecting the sensor channel 26 to the fluid channel 12. In other implementations, the heater element(s) and sensor elements may be disposed directly on a wall of the fluid channel 12 (or on another substrate that is disposed directly on the wall of the fluid channel 12), without an additional sensor channel 26 (e.g., as is shown in FIG. 4). When a fluid flow is present in fluid channel 12, at least some of the fluid flow 14 may flow through opening 30 into the sensor channel 26, across one or more heater elements, such as heater element 22, and one or more sensing elements, such as sensing elements 21 and 24, and through an opening 32 back into the fluid channel 12.

Figure 5:
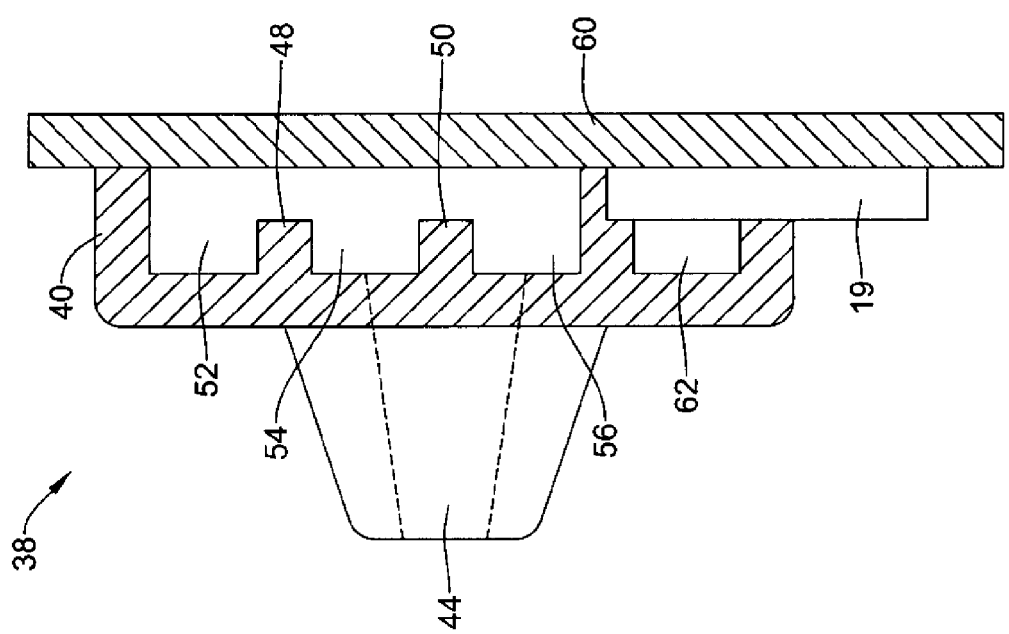
FIG. 5 is a cross-section view of the illustrative packaged thermal flow sensor assembly of FIG. 4 with a cover.

FIGS. 4 and 5 are top and cross-sectional views of a flow sensor assembly 38. In the illustrative embodiment, the flow sensor assembly 38 may be configured to have an enhanced or an increased flow range, while still having a stable, reliable and repeatable output signal from the flow sensor without experiencing sensor saturation. In fluid dynamics, the mass volumetric flow rate, often specified in SLPM (standard liters per minute), SCCM (standard cubic centimeters per minute), or SCFH (standard cubic feet per hour), is typically related to the flow velocity and the cross-sectional area of the flow channel. Increasing the cross-sectional area of the flow channel may increase the mass volumetric flow rate (e.g. range and/or sensitivity) of the flow sensor assembly 38. Also, positioning the sensing element (e.g. flow sensor 19) in a bypass channel of the flow sensor assembly 38 such that the sensing element is exposed to only a fraction of the fluid flow rate (based on the pressure differential across the bypass channel) may further increase the mass volumetric flow rate range and/or sensitivity of the flow sensor assembly 38. By providing the sensor in such a bypass channel, the mass volumetric flow rate range of the flow sensor assembly 38 may be effectively increased by, for example, a factor of 10 or more, a factor of 15 or more, a factor of 20 or more, a factor of 20 or more, a factor of 30 or more, or other factor according to the specific design and geometry of the flow sensor assembly 38.

In the illustrative embodiment, the flow sensor assembly 38 may include an inlet port 42, and outlet port 44, a flow channel 46 extending between the inlet port 42 and the outlet port 44, and a bypass channel 62 in fluid communication with the flow channel 46. As shown, the bypass channel 62 includes an upstream tap 64 and a downstream tap 66 fluid connecting the bypass channel 62 to the flow channel 46. In some cases, the upstream tap 64 and the downstream tap 66 may be positioned generally perpendicular to the flow channel 46, but other orientations may be used, as desired.

In some instances, the geometry of the fluid channel can affect the stability of the fluid flow. Reynolds number (Re), which is an index relating to turbulence in the fluid channel, is given by:

$$Re = \rho * V * d / \mu$$

where:
 $\rho$ is a fluid density;
 V is a mean velocity of flow;
 d is a characteristic distance (diameter of hydraulic radius); and
 $\mu$ is a viscosity.

Generally, a laminar flow occurs at low Reynolds numbers, where viscous forces may be dominant, and is characterized by smooth, constant fluid motion, while a turbulent flow occurs at high Reynolds numbers and is dominated by inertial forces, which tend to produce chaotic eddies, vortices and other flow instabilities. Laminarizing a fluid flow through the fluid channel can be accomplished by adjusting the geometry of the fluid sub-passages (e.g. diameter of hydraulic radius) to reduce the Reynolds number (Re) of the fluid flow.

In some instances, the flow sensor assembly 38 may include one or more partitions, such as partitions 48 and 50, in flow channel 46 to at least partially define one or more fluid sub-passages or chambers, shown as sub-passages 52, 54, and 56. In the example shown, two partitions 48 and 50 are provided. However, it is contemplated that other numbers of partitions may be used, such as, for example, zero, one or more partitions, two or more partitions, three or more partitions, four or more partitions, five or more partitions, six or more partitions, seven or more partitions, or any other number of partitions, as desired. The partitions 48 and 50 are shown as defining three fluid sub-passages 52, 54, and 56. However, it is contemplated that other numbers of fluid sub-passages may be provided, such as, for example, two or more sub-passages, three or more sub-passages, four or more sub-passages, five or more sub-passages, six or more sub-passages, seven or more sub-passages, eight or more sub-passages, or any other number of fluid sub-passages, as desired.

In the illustrative embodiment, each partition 48 and 50 may be configured to have a length, which extends in a direction parallel to the flow channel 46, which may be greater than a width, which extends in a direction perpendicular to the flow channel 46. In some instances, the length and width of each partition 48 and 50 may be the same, but in other cases, it is contemplated that the partitions 48 and 50 may have different lengths and/or widths. In the embodiment shown, each of the sub-passages 52, 54 and 56 are fluidly connected to the other sub-passages both upstream and downstream of the partitions 48 and 50, but this is not required. Also, the partitions 48 and 50 may or may not be configured to fluidly isolate each of the sub-passages 52, 54 and 56 from each other along the length of the partitions 48 and 50. For example, as shown in FIG. 5, the partitions 48 and 50 may be fin type dividers having a height extending only partially across the flow channel 46 in a direction perpendicular to the fluid flow. Also, in some embodiments, the fluid sub-passages 52, 54, and 56 may be configured to have the same or substantially similar cross-sectional area, such that the volume of fluid flowing through each of the fluid sub-passages 52, 54, and 56 may be the same or substantially the same. However, it is contemplated that different cross-sectional areas may be used for the fluid sub-passages 52, 54, and 56, as desired.

In the illustrative embodiment, the partitions 48 and 50 can help reduce the turbulence in the fluid passing through the flow channel 46 by reducing the diameter of hydraulic radius and consequently, the Reynolds number of the fluid sub-passage. In some instances, the one or more partitions 48 and 50 may be configured to help laminarize the fluid flow in the flow channel 46 by creating a more consistent flow and mitigating turbulent effects of the flow of fluid. In some cases, the laminar flow can reduce the noise seen by the flow sensor 19, providing a more consistent, reliable, repeatable, and stable output of the flow sensor assembly 38.

As shown in FIG. 4, the flow sensor assembly 38 may have a first static pressure $P_1$ at the upstream tap 64 and a second static pressure $P_2$ at the downstream tap 66. The pressure differential between the upstream tap 64 and the downstream tap 66 can drive a fraction of the fluid flow through the bypass channel 62. In some cases, the fraction of the fluid may be, for example, one-fifth, one-tenth, one-fifteenth, one-twentieth, or any other suitable fraction of the fluid flow entering the inlet port 42.

In some embodiments, the dimensions and/or configuration of the bypass channel 62 may be set in order to provide a desired flow rate or range of flow rates across flow sensor 19 for a given flow rate or range of flow rates through the flow channel 46. Excessive fluid flow through the bypass channel and across the flow sensor 19 may cause, for example, sensor saturation. Too little fluid flow through the bypass channel can result in a sensor output signal that has an insufficient dynamic range and/or resolution. In either case, flow sensor 19 may imprecisely measure the flow rate of a fluid flowing through flow sensor assembly 38. In some cases, one or more features may be provided in the bypass channel to restrict the fluid flow rate through the bypass channel. Such features may include, for example, one or more flow restrictors formed in the upstream tap, the downstream tap and/or the bypass channel itself between the upstream tap and downstream tap. Such features may also include one or more porous inserts positioned in the upstream tap, the downstream tap and/or the bypass channel between the upstream tap and downstream tap. In some cases, the length of the bypass channel itself may be set relative to the cross sectional area of the bypass channel so as to provide a desired flow rate or range of flow rates across flow sensor 19 for a given flow rate or range of flow rates through the flow channel 46.

In some instance, the flow sensor assembly 38 may include a housing 40 and a cover 60 (shown in FIG. 5). The cover 60 may be mounted on or otherwise sealingly engaged to the housing 40. With such a configuration, the housing 40 and cover 60 may define the flow channel 46 and/or protect the flow sensor 19 and/or any associated signal conditioning circuitry that may be provided in the flow sensor assembly 38. In some embodiments, the cover 60 may be a circuit board (e.g. printed circuit board) or other substrate having the flow sensor 19 mounted thereon. However, any other suitable cover 60 may be used.

In some embodiments, the housing 40 may define the inlet port 42, outlet port 44, three or more sides of the flow channel 46, three or more sides of the bypass channel 62, and partitions 48 and 50 (when provided), but this is not required. In some cases, the inlet port 42, outlet port 44, three or more sides of the flow channel 46, three or more sides of the bypass channel 62, and partitions 48 and 50 (when provided) may be formed from a single part (e.g. a single molded part). In such an embodiment, the cover 60 may define the fourth, or top, side of the flow channel 46 and a fourth, or top, side of the bypass channel 62. As shown in FIG. 5, the partitions 48 and 50 (when provided) may be configured to have a height such that partitions 48 and 50 do not engage the cover 60. However, it is contemplated that partitions 48 and 50 may be configured to have a height such that partitions 48 and 50 engage the cover 60, if desired. In some instances, it is contemplated that the cover 60 may be configured to define all or part of the inlet port 42, outlet port 44, three or more sides of the flow channel 46, three or more sides of the bypass channel 62, and/or partitions 48 and 50, if desired.

In the illustrative embodiment, the housing, including the housing 40 and the cover 60, may be formed as a composite. This may, in some cases, aid in molding the housing 40 and the cover 60. However, it is contemplated that the housing 40 may be molded in a single piece from a plastic, ceramic, metal or any other suitable material according to design considerations. It is also contemplated that the housing may be formed by injection molding, or may be made by any other suitable methods and materials, as desired.

In some embodiments, the inlet port 42 and/or the outlet port 44 may enter at an angle relative to the flow channel 46. As shown in FIG. 4, for example, the inlet port 42 and the outlet port 44 may be generally perpendicular (angle=90 degrees) to the flow channel 46. However, other angles are also contemplated, including no angle (in-plane with the flow channel 46). In some embodiments, the inlet port 42 and the outlet port 44 may be fluidly coupled to a main flow channel (not shown) of a larger system (such as a respirator), but this is not required.

In some instances, the inlet port 42 and/or the outlet port 44 may have a diameter or cross-sectional area that is reduced relative to the bypass channel 62. However, it is contemplated that the inlet port 42 and/or the outlet port 44 may have diameters and/or cross-sectional areas that are about the same as or that are greater than the bypass channel 62, if desired.

In the illustrative embodiment, a flow sensor 19 is provided in fluid communication with the bypass channel 62 of flow sensor assembly 38. When a non-zero fluid flow is present in the flow channel 46, the fluid may flow through the inlet port 42, through flow channel 46, through fluid sub-passages 52, 54, and 56 (when present), and through outlet port 44. This fluid flow may setup a first static pressure $P_1$ at the upstream tap 64 of the bypass channel 62 and a second static pressure $P_2$ at the downstream tap 66. This differential pressure ($P_1-P_2$) will cause a fraction of the fluid to pass through upstream tap 64 (in some cases, upstream of the partitions 48 and 50), through bypass channel 62 and across flow sensor 19, and out downstream tap 66 and back into the flow channel 46 (in some cases, downstream of the partitions 48 and 50).

In the illustrative embodiment, at least some of the fluid flowing through bypass channel 62 may enter a flow sensor opening 30, flow over upstream sensing element 21, heater element 22, and downstream sensing element 24, out flow sensing opening 32 and back into the bypass channel 62. When the heater element 22 is heated to a temperature higher than the ambient temperature of the fluid in the fluid flow, the symmetrical temperature distribution may be disturbed and the amount of disturbance may be related to the flow rate of the fluid flow through bypass channel 62, which may be related to the fluid flow through flow channel 46. The flow rate of the fluid flow may cause the upstream sensor element 21 to sense a relatively cooler temperature than the downstream sensor element 24 of the illustrative flow sensor 19. In other words, the flow rate of the fluid flow may cause a temperature differential between the upstream sensor element 21 and the downstream sensor element 24, which may be related to the flow rate of the fluid flow in the bypass channel 62, and hence, flow channel 46. The temperature differential between the upstream sensor element 21 and the downstream sensor element 24 may result in an output voltage differential between the upstream sensor element 21 and the downstream sensor element 24.

In some instances, the flow sensor 19 may not include a separate flow channel that is separate from the bypass channel 62. Rather, in some cases, the flow sensor 19 may directly expose a heater element 22 and one or more sensor elements 21 and 24 directly to the fluid bypass channel 62 to directly measure the flow rate in the bypass channel 62 (rather than in a separate sensor channel). In other instances, it is contemplated that the flow sensor 19 may measure the mass flow and/or velocity of the fluid flow 14 in the bypass channel 62 using a thermal sensor, pressure sensor, acoustical sensor, optical sensor, pitot tube, and/or any other suitable flow sensor, as desired.

Although not shown, the flow sensor assembly 38 may include one or more electrical leads that are electrically connected to the flow sensor 19, which may extend external to the housing. In some cases, the one or more electrical leads may include a metal, however, any suitable conducting material may be used, as desired.

Figure 6:
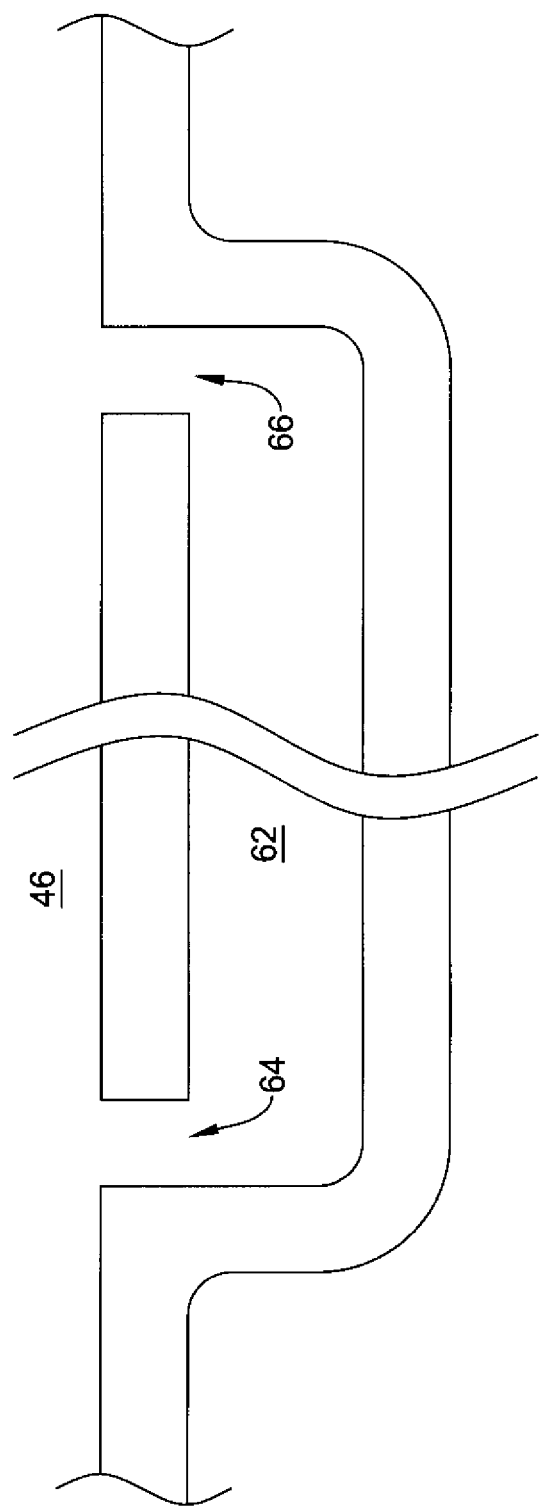
FIG. 6 is a cross-sectional view of an illustrative flow restrictor that may be used in the packaged thermal flow sensor assembly of FIG. 4.

In some embodiments, the upstream tap 64 and/or downstream tap 66 of the bypass channel 62 may be sized or configured as flow restrictors, as best shown in FIG. 6. These flow restrictors may help reduce the flow rate of the fluid passing across the flow sensor 19 for a given flow rate through the flow channel 46. In FIG. 6, the tap 64 may have a diameter that is smaller than the diameter of the bypass channel 62 to help restrict the fluid flow rate entering the bypass channel 62 for a given pressure drop across the bypass channel 62. By precisely and/or accurately sizing the diameter and/or lengths of the taps 64 and 66 and/or bypass channel 62 more generally, the flow sensor assembly 38 may better control and/or balance the relationship between the mass flow rate range to be sensed at the flow sensor 19 and the pressure differential ($P_1-P_2$) created by the fluid flowing through the flow channel 46.

While FIG. 6 shows both upstream tap 64 and downstream tap 66 as being configured as flow restrictors (e.g. reduced diameter relative to the bypass channel more generally), only one (or none) of the upstream tap 64 or the downstream tap 66 may be configured as a flow restrictor, as desired. Further, it is contemplated that the length of the reduced diameter portion may extend the entire length of taps 64 and 66, or only a portion of the length, if desired.

Figure 7:
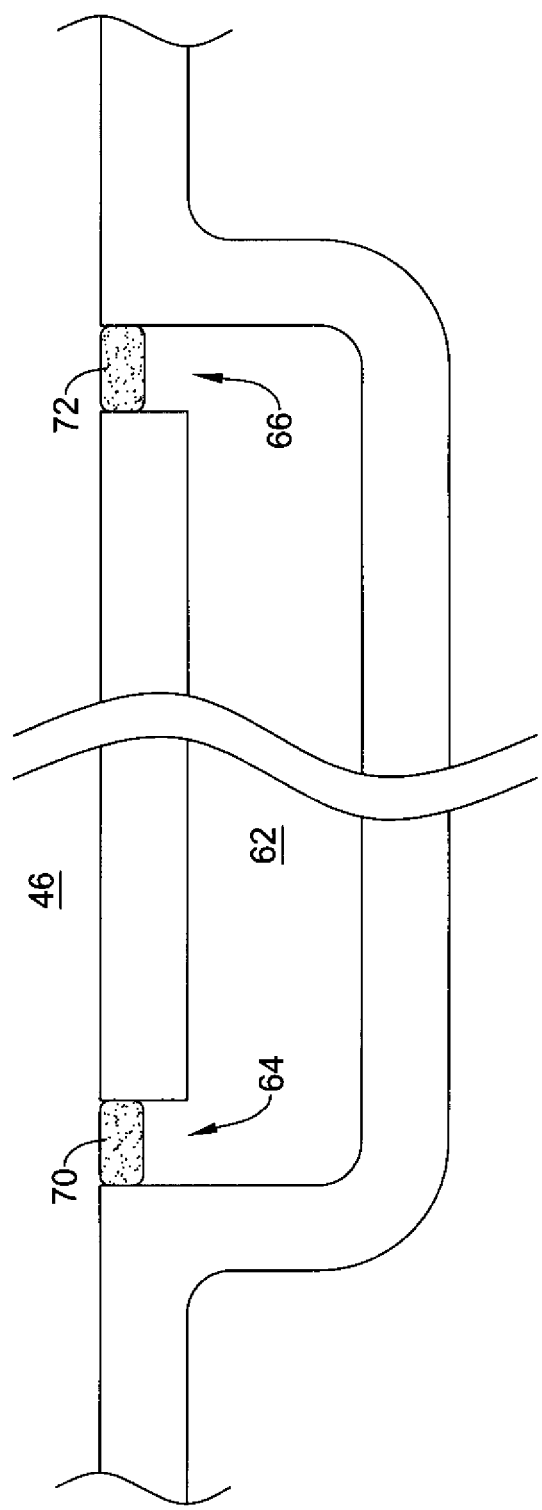
FIG. 7 is a cross-sectional view of an illustrative porous insert that may be used in the packaged thermal flow sensor assembly of FIG. 4.
Figure 8:
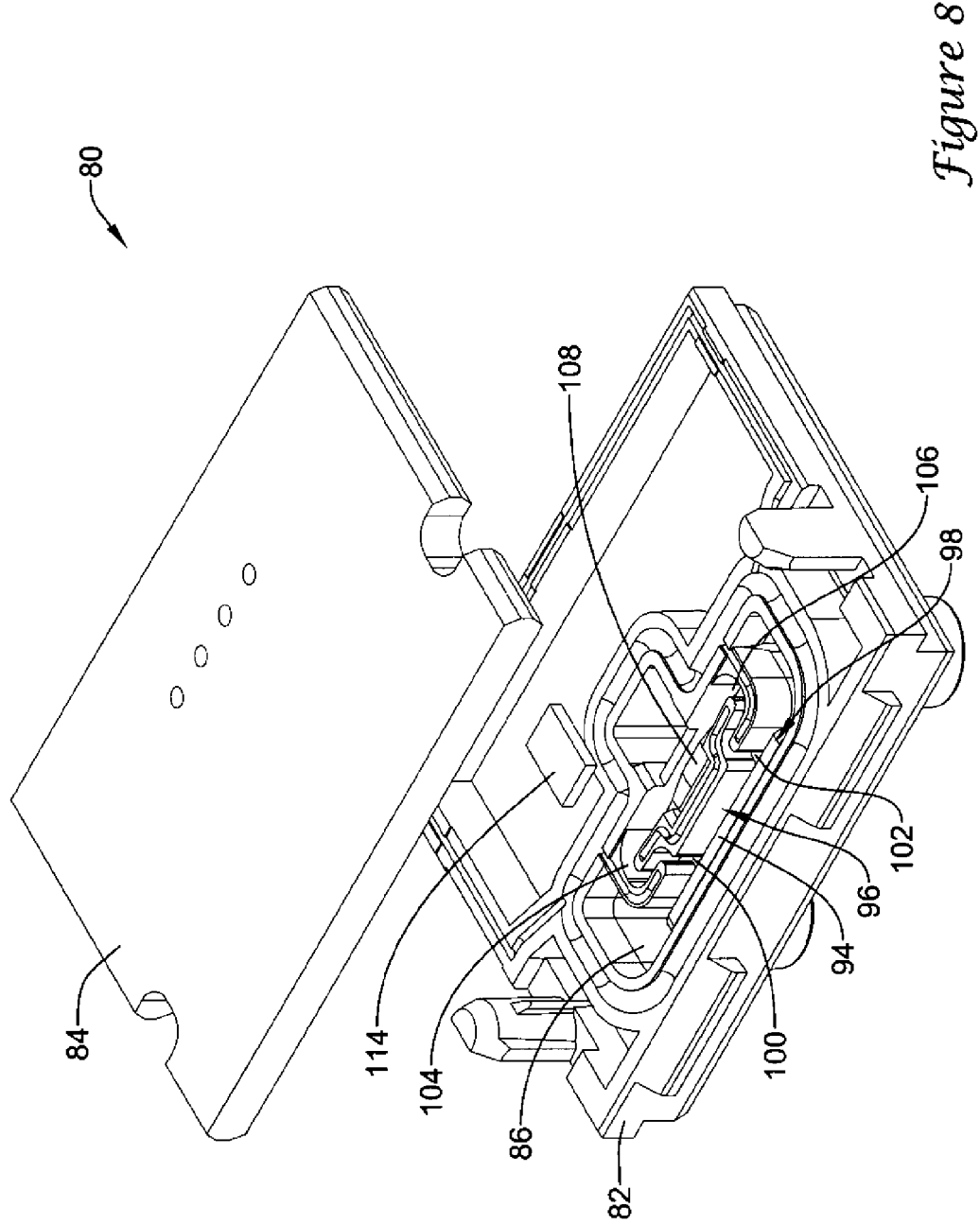
FIG. 8 is an exploded view of another illustrative embodiment of a packaged thermal flow sensor assembly.

In some embodiments, a porous insert, such as porous inserts 70 and 72, may be positioned in the upstream tap 64 and/or the downstream tap 66, as shown in FIG. 7. The porous inserts 70 and 72 may help laminarize the fluid flow and/or control the pressure drop and thus flow rate across flow sensor

19. In the illustrative embodiment of FIG. 7, porous insert 70 is provided in tap 64 and porous insert 72 is provided in tap 66. However, it is contemplated that only one (or none) of porous inserts 70 and 72 may be provided, if desired.

In some embodiments, the porous insert 70 may be inserted, pressed, or otherwise positioned in or adjacent to upstream tap 64. Porous insert 72 may be inserted, pressed, or otherwise positioned in or adjacent to downstream tap 66. In some embodiments, the porous inserts 70 and 72 may be generally cylindrical in shape. However, it is contemplated that any suitable shape may be used, depending on the shape of the tap that the insert is to be inserted. In other cases, it is contemplated that the porous inserts 70 and 72 may be any shape and, when inserted in the taps 64 and 66, the porous inserts 70 and 72 may be deformable to accommodate the shape of the taps 64 and 66.

The porous inserts 70 and 72 can be configured to have a length and/or density that produces a desired or predetermined pressure drop so that a desired flow rate or flow rate range is experienced at the flow sensor 19 for a given flow rate or flow range in the flow channel 46. For example, increasing the length and/or increasing the density of the porous inserts 70 and 72 (e.g. reducing the pore size) may increase the pressure drop across the porous insert, whereas decreasing the length and/or decreasing the density of the porous inserts 70 and 72 may decrease the pressure drop. In some cases, increasing the density of the upstream porous insert 70 (e.g. reducing the pore size) and/or providing relatively uniform pore sizes may help provide a more laminar fluid flow the flow sensor 19. It is contemplated that any suitable length and/or density may be used for the porous inserts 70 and 72, depending on the desired pressure drop and/or laminarization of the fluid flow in the bypass channel 62. In some embodiments, it is contemplated that the embodiment shown in FIG. 6 may be combined with the embodiments shown in FIG. 7. In other words, it is contemplated that the porous inserts 70 and/or 72 may be inserted into taps 64 and/or 66, which may be configured as flow restrictors having reduced diameters.

Figure 9:
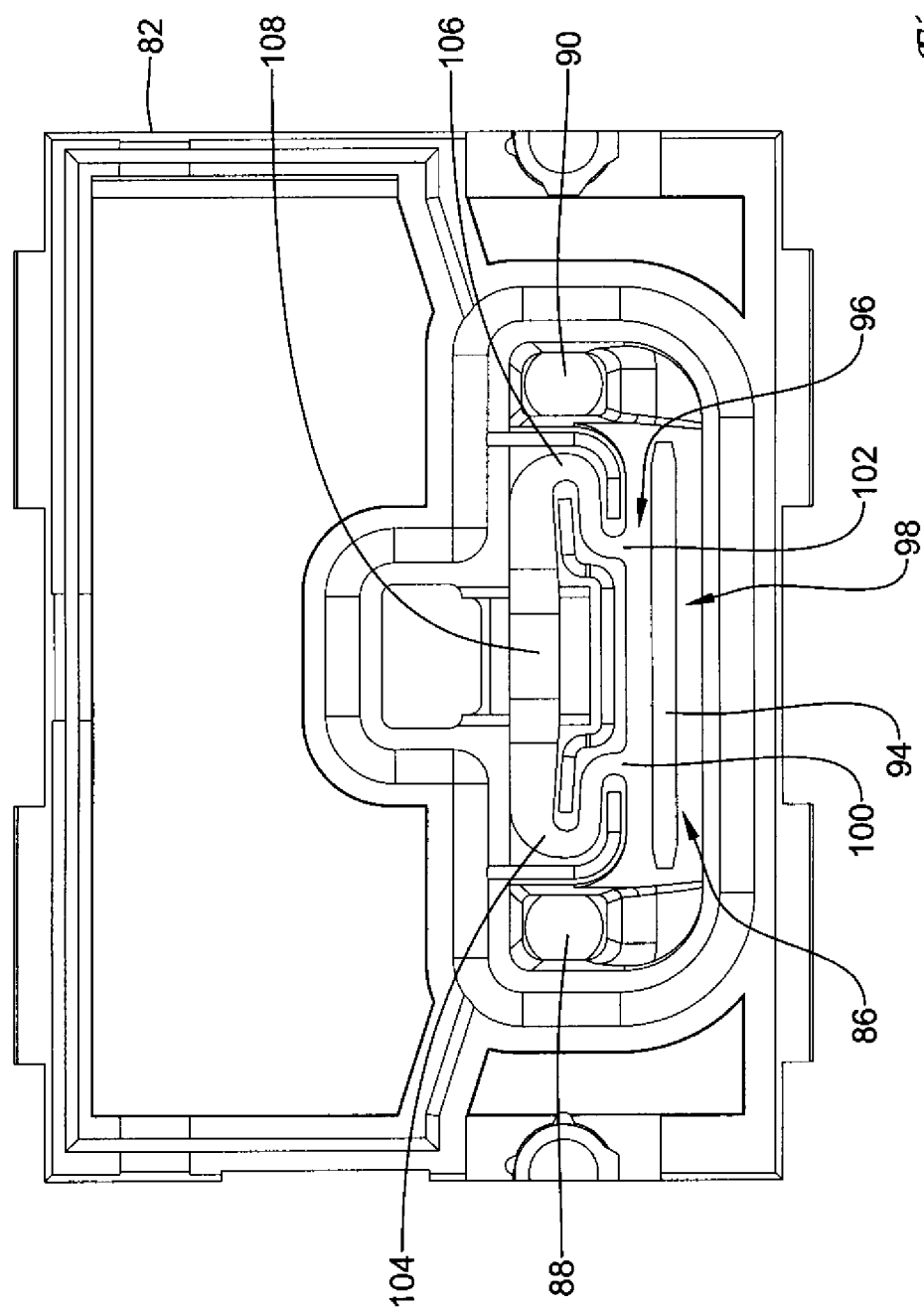
FIG. 9 is a top view of a housing of the illustrative packaged thermal flow sensor assembly of FIG. 8.
Figure 10:
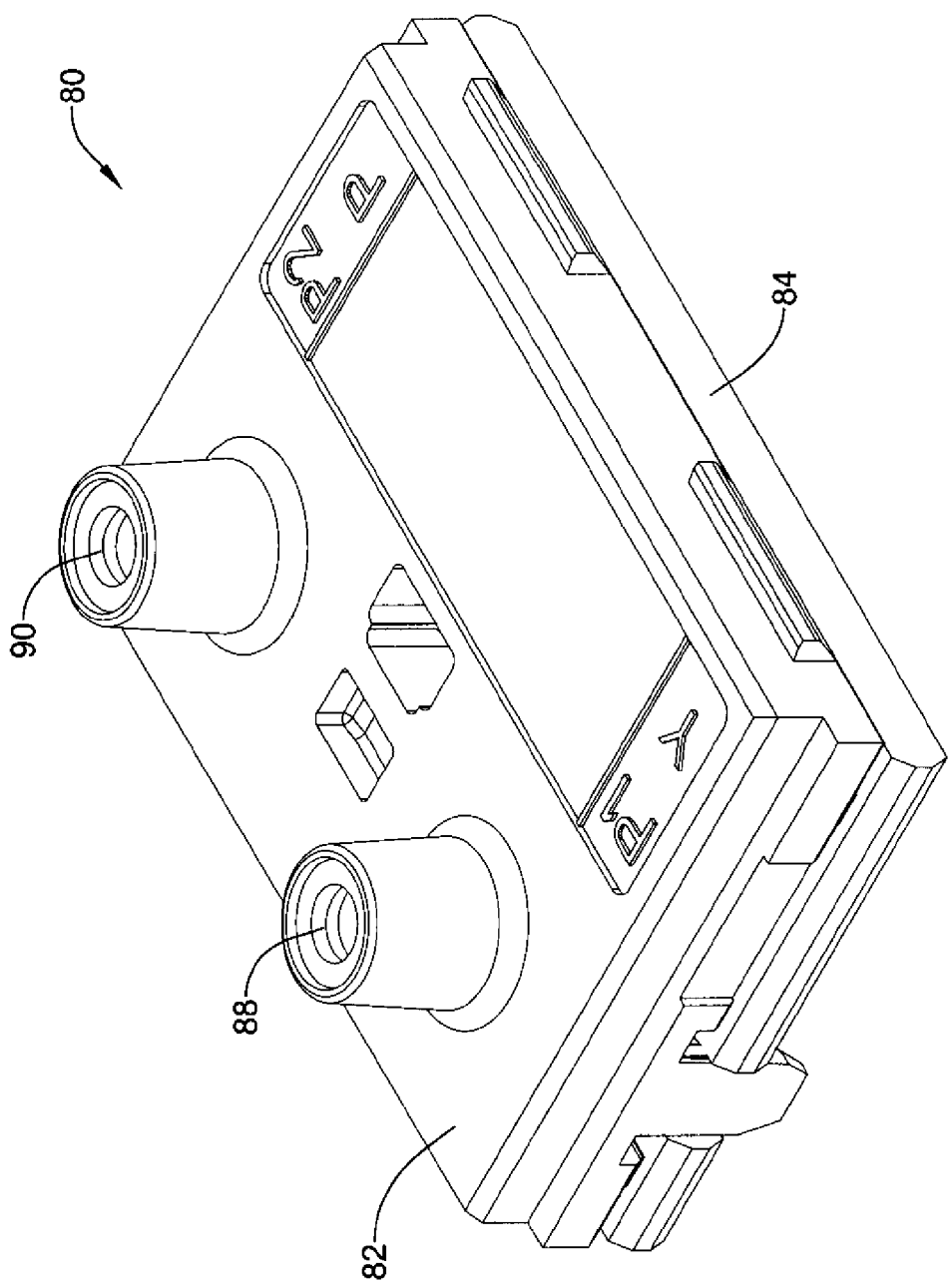
FIG. 10 is a bottom perspective view of the illustrative packaged thermal flow sensor assembly of FIG. 8.

FIGS. 8-11 are views of another illustrative embodiment of a flow sensor assembly 80. As shown, the flow sensor assembly 80 may include a housing 82 and cover 84 for housing a flow sensor 114. The cover 84 is configured to be mounted on or otherwise sealingly engaged to the housing 82. With such a configuration, the housing 82 and cover 84 may define the flow channel 86 and/or protect the flow sensor 114 and/or any associated signal conditioning circuitry that may be provided in the flow sensor assembly 80. As illustrated in FIGS. 9 and 10, the housing 82 includes an inlet port 88 and an outlet port 90 for exposing the flow channel 86 to a fluid flow. The flow sensor assembly 80 may include a flow sensor 114, which may be similar to flow sensor 19, positioned in or adjacent to the flow channel 86 and configured to sense a rate of fluid flow through the flow channel 86.

Flow sensor assembly may also include a bypass channel 92 in fluid communication with the flow channel 86. As shown, the bypass channel 92 includes an upstream tap 100 and a downstream tap 102 fluid connecting the bypass channel 92 to the flow channel 86. In some instances, the flow sensor assembly 80 may include one or more partitions, such as partition 94, in flow channel 86 to at least partially define one or more fluid sub-passages or chambers, shown as sub-passages 96 and 98. In the example shown, partition 94 is provided. However, it is contemplated that other numbers of partitions may be used, such as, for example, zero, one or more partitions, two or more partitions, three or more partitions, four or more partitions, five or more partitions, six or more partitions, seven or more partitions, or any other number of partitions, as desired. The partition 94 is shown as defining two fluid sub-passages 96 and 98. However, it is contemplated that other numbers of fluid sub-passages may be provided, such as, for example, two or more sub-passages, three or more sub-passages, four or more sub-passages, five or more sub-passages, six or more sub-passages, seven or more sub-passages, eight or more sub-passages, or any other number of fluid sub-passages, as desired.

Figure 11:
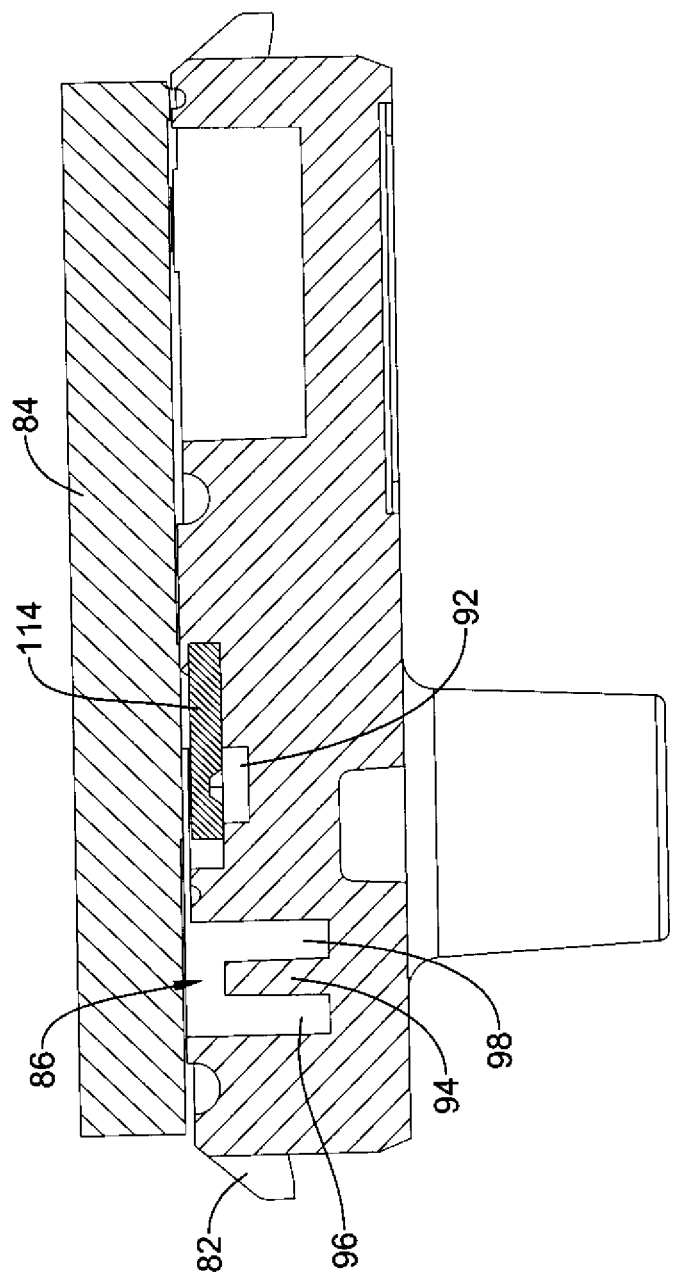
FIG. 11 is a cross-sectional view of the illustrative packaged thermal flow sensor assembly of FIG. 8.

In the illustrative embodiment, partition 94 may be configured to have a length, which extends in a direction parallel to the flow channel 86, which may be greater than a width, which extends in a direction perpendicular to the flow channel 86. In the embodiment shown, each of the sub-passages 96 and 98 are fluidly connected to the other sub-passages both upstream and downstream of the partition 94, but this is not required. Also, the partition 94 may or may not be configured to fluidly isolate each of the sub-passages 96 and 98 from each other along the length of the partition 94. For example, as shown in FIG. 11, the partition 94 may be fin type dividers having a height extending only partially across the flow channel 86 in a direction perpendicular to the fluid flow. That is, partition 94 may be spaced from the cover 84. Also, in some embodiments, the fluid sub-passages 96 and 98 may be configured to have the same or substantially similar cross-sectional area, such that the volume of fluid flowing through each of the fluid sub-passages 96 and 98 may be the same or substantially the same. However, it is contemplated that different cross-sectional areas may be used for the fluid sub-passages 96 and 98, as desired.

In the illustrative embodiment, the partition 94 can help reduce the turbulence in the fluid passing through the flow channel 86 by reducing the diameter of hydraulic radius and consequently, the Reynolds number of the fluid sub-passage. In some instances, the one or more partitions 94 may be configured to help laminarize the fluid flow in the flow channel 86 by creating a more consistent flow and mitigating turbulent effects of the flow of fluid. In some cases, the laminar flow can reduce the noise seen by the flow sensor 114, providing a more consistent, reliable, repeatable, and stable output of the flow sensor assembly 80.

In the illustrative embodiment, the flow sensor assembly 80 may have a first static pressure $P_1$ at the upstream tap 100 and a second static pressure $P_2$ at the downstream tap 102. The pressure differential between the upstream tap 100 and the downstream tap 102 can drive a fraction of the fluid flow through the bypass channel 92. In some cases, the fraction of the fluid may be, for example, one-fifth, one-tenth, one-fifteenth, one-twentieth, or any other suitable fraction of the fluid flow entering the inlet port 88.

As shown in, for example, FIG. 9, the upstream tap 100 may be positioned downstream of an upstream end of partition 94 and the downstream tap 102 may be positioned upstream of a downstream end of the partition 94. That is, upstream tap 100 and downstream tap 102 may be positioned in fluid sub-passage 96. However, it contemplated that upstream tap 100 may be positioned upstream of the partition 94 and/or downstream tap 102 may be positioned downstream of partition 94.

In some embodiments, the dimensions and/or configuration of the bypass channel 92 may be set in order to provide a desired flow rate or range of flow rates across flow sensor 114 for a given flow rate or range of flow rates through the flow channel 86. Excessive fluid flow through the bypass channel and across the flow sensor 114 may cause, for example, sensor saturation. Too little fluid flow through the bypass channel can result in a sensor output signal that has an insufficient dynamic range and/or resolution. In either case, flow sensor 114 may imprecisely measure the flow rate of a fluid flowing through flow sensor assembly 80. In some cases, one or more features may be provided in the bypass channel to restrict the fluid flow rate through the bypass channel. Such features may include, for example, one or more flow restrictors formed in the upstream tap, the downstream tap and/or the bypass channel itself between the upstream tap and downstream tap. Such features may also include one or more porous inserts positioned in the upstream tap, the downstream tap and/or the bypass channel between the upstream tap and downstream tap. In some cases, the length of the bypass channel itself may be set relative to the cross sectional area of the bypass channel so as to provide a desired flow rate or range of flow rates across flow sensor 114 for a given flow rate or range of flow rates through the flow channel 86.

In some cases and as shown in FIG. 9, the bypass channel 92 may be configured to have a generally s-shaped (or partial s-shaped) curve 104 and 106 adjacent to the upstream tap 100 and/or the downstream tap 102. For instance, the generally s-shaped curve 104 adjacent to the upstream tap 100 may initially curve back towards the inlet port 88 and then back towards the outlet port 90 and flow sensor 114. Similarly, the generally s-shaped curve adjacent to downstream tap 102 may initially curve toward the outlet port 90 and then back towards the inlet 88 and flow sensor 114.

In some embodiment, the bypass channel 92 may include a boss 108 or other feature configured to direct the fluid through the flow sensor 114. For example, boss 108 may include a first taper reducing the cross-sectional area of the bypass channel 92 and a second taper increasing the cross-sectional area of the bypass channel 92. In some cases, the flow sensor 114 can be positioned between the first taper and the second taper, but this is not required.

In some embodiments, the housing 82 may define the inlet port 88, outlet port 90, three or more sides of the flow channel 86, three or more sides of the bypass channel 92, and partition 94, but this is not required. In some cases, the inlet port 88, outlet port 90, three or more sides of the flow channel 86, three or more sides of the bypass channel 92, and partition 94 (when provided) may be formed from a single part (e.g. a single molded part). In such an embodiment, the cover 84 may define the fourth, or top, side of the flow channel 86 and a fourth, or top, side of the bypass channel 92. As shown in FIG. 11, the partition 94 may be configured to have a height such that partition 94 does not engage the cover 84, or partition 94 is spaced from the cover 84. However, it is contemplated that partition 94 may be configured to have a height such that partition 94 engages the cover 84, if desired.

In the illustrative embodiment, the housing 82 and the cover 84, may be formed as a composite. This may, in some cases, aid in molding the housing 82 and the cover 84. However, it is contemplated that the housing 82 and cover 84 may be molded in a single piece from a plastic, ceramic, metal or any other suitable material according to design considerations. It is also contemplated that the housing may be formed by injection molding, or may be made by any other suitable methods and materials, as desired. In some cases, cover 84 may be a printed circuit board or other suitable substrate for mounting flow sensor 114 thereon.

In some embodiments, the inlet port 88 and/or the outlet port 90 may enter at an angle relative to the flow channel 86. As shown in FIG. 9, for example, the inlet port 88 and the outlet port 90 may be generally perpendicular (angle=90 degrees) to the flow channel 86. However, other angles are also contemplated, including no angle (in-plane with the flow channel 86). In some embodiments, the inlet port 88 and the outlet port 90 may be fluidly coupled to a main flow channel (not shown) of a larger system (such as a respirator), but this is not required.

In the illustrative embodiment, a flow sensor 114 can be provided in fluid communication with the bypass channel 92 of flow sensor assembly 80. When a non-zero fluid flow is present in the flow channel 86, the fluid may flow through the inlet port 88, through flow channel 86, through fluid sub-passages 96 and 98 (defined by partition 94), and through outlet port 90. This fluid flow may setup a first static pressure $P_1$ at an upstream tap 100 of the bypass channel 86 and a second static pressure $P_2$ at the downstream tap 102. This differential pressure $(P_1-P_2)$ will cause a fraction of the fluid to pass through upstream tap 100 (in some cases a fraction of fluid flowing through sub-passage 96), through bypass channel 92 and across flow sensor 114, and out downstream tap 102 and back into the flow channel 86 (in some cases back into sub-passage 96).

Although not shown, the flow sensor assembly 80 may include one or more electrical leads that are electrically connected to the flow sensor 114, which may extend external to the housing. In some cases, the one or more electrical leads may include a metal, however, any suitable conducting material may be used, as desired.

Having thus described several illustrative embodiments of the present disclosure, those of skill in the art will readily appreciate that yet other embodiments may be made and used within the scope of the claims hereto attached. Numerous advantages of the disclosure covered by this document have been set forth in the foregoing description. It will be understood, however, that this disclosure is, in many respect, only illustrative. Changes may be made in details, particularly in matters of shape, size, and arrangement of parts without exceeding the scope of the disclosure. The disclosure's scope is, of course, defined in the language in which the appended claims are expressed.

What is claimed is:

1. A flow sensor assembly, comprising:
a housing defining at least part of an inlet flow port, an outlet flow port, a fluid channel extending between the inlet flow port and the outlet flow port, and a bypass channel, wherein the bypass channel including an upstream tap in fluid communication with the fluid channel upstream at a first location, and a downstream tap in fluid communication with the fluid channel at a second location, the bypass channel having a generally s-shaped curve adjacent to the upstream tap and/or the downstream tap, wherein a pressure differential between the first location and the second location drives at least a portion of a fluid through the bypass channel; and
a flow sensor positioned in fluid communication with the bypass channel, and configured to sense a measure related to a flow rate of a fluid flowing through the bypass channel, which is related to the flow rate of a fluid flowing through the fluid channel.

2. The flow sensor assembly of claim 1, wherein the housing is a single piece part.

3. The flow sensor assembly of claim 1, further comprising a cover mounted to the housing, wherein the cover is configured to define the remaining portions of the fluid channel and the bypass channel.

4. The flow sensor assembly of claim 1, further comprising one or more features to restrict a fluid flow rate through the bypass channel, the one or more features including any of:
one or more flow restrictors formed in the upstream tap, the downstream tap and/or the bypass channel between the upstream tap and downstream tap;

one or more porous inserts positioned in the upstream tap, the downstream tap and/or the bypass channel between the upstream tap and downstream tap.

\* \* \* \* \*